United States Patent
Kim (10) Patent No.: US 11,748,025 B2
(45) Date of Patent: Sep. 5, 2023

(54) NONVOLATILE MEMORY DEVICE, DATA STORAGE DEVICE INCLUDING THE SAME AND OPERATING METHOD THEREOF

(71) Applicant: SK hynix Inc., Gyeonggi-do (KR)

(72) Inventor: Jee Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/363,521

(22) Filed: Jun. 30, 2021

(65) Prior Publication Data

US 2021/0326060 A1    Oct. 21, 2021

Related U.S. Application Data

(62) Division of application No. 16/217,682, filed on Dec. 12, 2018, now Pat. No. 11,074,006.

(30) Foreign Application Priority Data

Feb. 27, 2018 (KR) .................. 10-2018-0023693

(51) Int. Cl.
G06F 3/06    (2006.01)

(52) U.S. Cl.
CPC .......... *G06F 3/0655* (2013.01); *G06F 3/061* (2013.01); *G06F 3/0679* (2013.01)

(58) Field of Classification Search
CPC ...... G06F 3/0655; G06F 3/061; G06F 3/0679; G06F 12/00; G06F 13/00
See application file for complete search history.

(56) References Cited

U.S. PATENT DOCUMENTS

| 5,548,552 A * | 8/1996 | Madurawe | H03K 19/17756 326/38 |
| 6,400,634 B1 * | 6/2002 | Liou | G11C 16/08 365/185.11 |
| 6,563,532 B1 * | 5/2003 | Strub | G11B 27/031 348/376 |
| 2010/0315875 A1 * | 12/2010 | Kim | H01L 27/11524 365/185.17 |

(Continued)

FOREIGN PATENT DOCUMENTS

KR    10-2015-0130638 A    11/2015

OTHER PUBLICATIONS

Office Action issued by the Korean Intellectual Property Office dated Mar. 31, 2022.

*Primary Examiner* — Tuan V Thai
(74) *Attorney, Agent, or Firm* — IP & T GROUP LLP (57) ABSTRACT

A nonvolatile memory device may include: a memory cell array operated by a first voltage, and including a plurality of memory cells; a peripheral circuit operated by the first voltage, and configured to store data in the memory cell array or read data from the memory cell array; an operation recorder operated by a second voltage, and configured to record information on an operation being performed in the nonvolatile memory device; and a control logic operated by the first voltage, and configured to control the peripheral circuit such that the nonvolatile memory device performs an operation corresponding to a command received from an external device, and control the operation recorder to store the information on the operation being performed in the nonvolatile memory device.

5 Claims, 8 Drawing Sheets

(56) References Cited

U.S. PATENT DOCUMENTS

| | | | |
|---|---|---|---|
| 2015/0135023 A1* | 5/2015 | Mekhanik | G11C 16/0483 714/704 |
| 2016/0056847 A1* | 2/2016 | Wang | H04W 52/50 455/343.2 |
| 2020/0411097 A1* | 12/2020 | Nam | G11C 16/0483 |

* cited by examiner

OIR

NONVOLATILE MEMORY DEVICE, DATA STORAGE DEVICE INCLUDING THE SAME AND OPERATING METHOD THEREOF

CROSS-REFERENCE TO RELATED APPLICATION

This application is a division of U.S. patent application Ser. No. 16/217,682 filed on Dec. 12, 2018, which claims benefits of priority of Korean Patent Application No. 10-2018-0023693 filed on Feb. 27, 2018. The disclosure of each of the foregoing application is incorporated herein by reference in its entirety.

BACKGROUND

1. Technical Field

Various embodiments generally relate to a semiconductor device, and more particularly, to a nonvolatile memory device, a data storage device including the same and an operating method thereof.

2. Related Art

Recently, the paradigm of the computing environment has changed to the ubiquitous computing environment where a computer system can be used anytime and anywhere. Therefore, the use of portable electronic devices such as mobile phones, digital cameras and notebook computers has rapidly increased. A portable electronic device generally uses a data storage device including a memory device. The data storage device is used to store data used in the portable electronic device.

Such a data storage device has no mechanical driver, and thus exhibits excellent stability and durability, accesses information at high speed, and has low power consumption. A data storage device having such advantages may include a universal serial bus (USB) memory device, a memory card having various interfaces, a universal flash storage (UFS) device, and a solid state drive (SSD).

SUMMARY

Various embodiments are directed to a nonvolatile memory device with enhanced operation performance, a data storage device including the same, and an operating method thereof.

In an embodiment, a nonvolatile memory device may include: a memory cell array operated by a first voltage, and including a plurality of memory cells; a peripheral circuit operated by the first voltage, and configured to store data in the memory cell array or read data from the memory cell array; an operation recorder operated by a second voltage, and configured to record information on an operation being performed in the nonvolatile memory device; and a control logic operated by the first voltage, and configured to control the peripheral circuit such that the nonvolatile memory device performs an operation corresponding to a command received from an external device, and control the operation recorder to store the information on the operation being performed in the nonvolatile memory device.

In an embodiment, a data storage device may include: a nonvolatile memory device operated by first and second voltages; and a controller configured to control the nonvolatile memory device and operated by the second voltage. The controller may transmit an information request command to the nonvolatile memory device depending on whether the nonvolatile memory device is powered off, and check an operation stopped by the power-off of the nonvolatile memory device and a performance status of the checked operation, based on the operation information received from the nonvolatile memory device.

In an embodiment, an operating method of a data storage device including a nonvolatile memory device and a controller may include: determining whether the nonvolatile memory device is powered off; transmitting an information request command to the nonvolatile memory device when the nonvolatile memory device is powered off; and checking an operation stopped by the power-off of the nonvolatile memory device and checking performance status of the operation based on operation information received from the nonvolatile memory device.

In an embodiment, a data storage device may include: a nonvolatile memory device including a memory cell array, a register, and control logic suitable for performing at least one operation for the memory cell array based on an operation command, and for storing, in the register, operation information on the performed operation; and a controller suitable for transmitting the operation command to the nonvolatile memory device, determining whether the memory cell array is powered off, and when it is determined that the memory cell array is powered off, transmitting a request command to request the stored operation information from the register to the nonvolatile memory device, and receiving the stored operation information from the nonvolatile memory device. The memory cell array and the control logic are operated by a first voltage, and the register and the controller are operated by a second voltage.

DETAILED DESCRIPTION

A nonvolatile memory device, a data storage device including the same and an operating method thereof in accordance with the present disclosure is described below with reference to the accompanying drawings through various embodiments. Throughout the specification, reference to "an embodiment," "another embodiment" or the like is not necessarily to the only one embodiment, and different references to any such phrase are not necessarily to the same embodiment(s).

Figure 1:
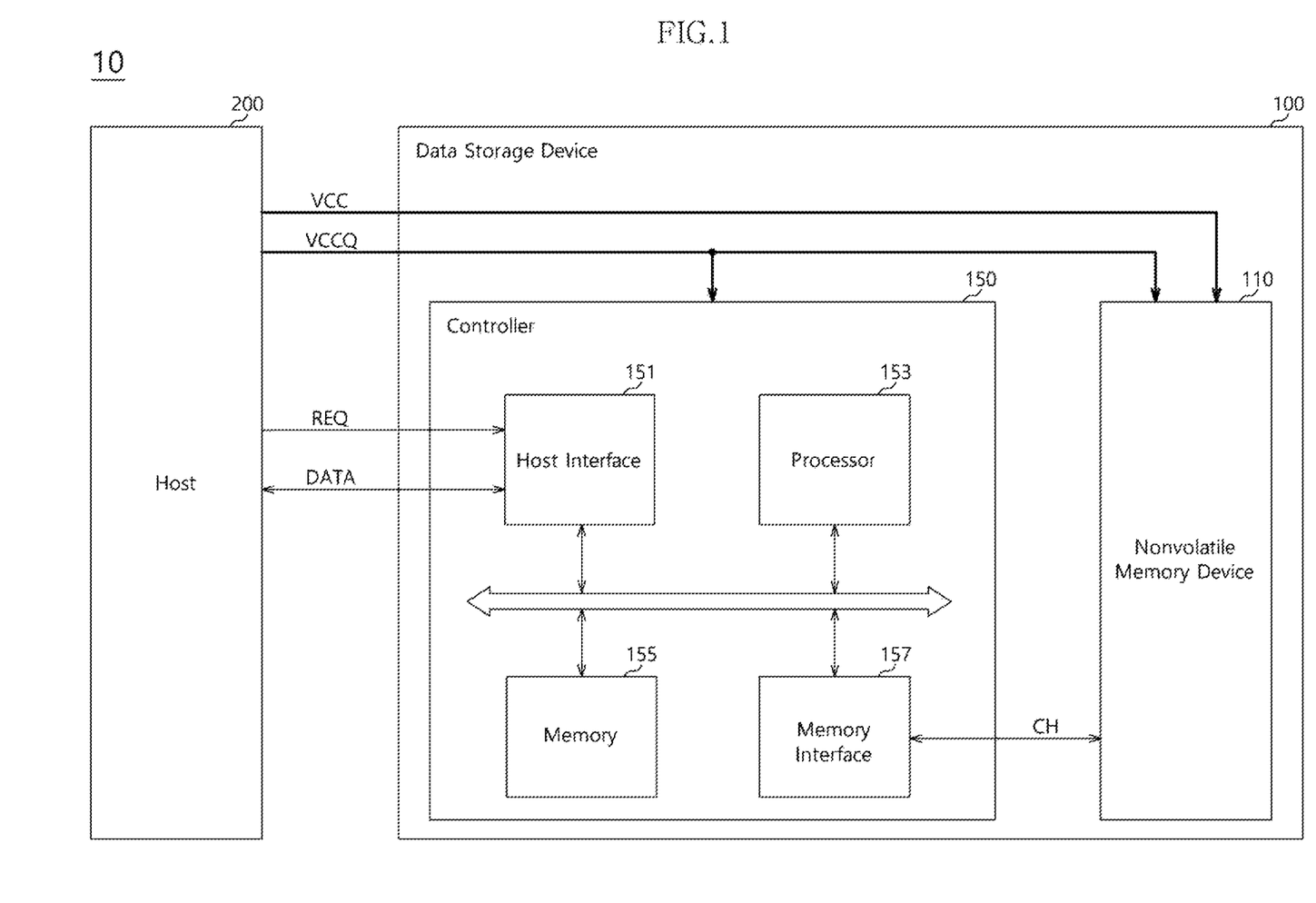
FIG. 1 is a block diagram illustrating a data processing system in accordance with an embodiment of the present disclosure.

FIG. 1 is a block diagram illustrating a data processing system 10 in accordance with an embodiment. The data processing system 10 may include a data storage device 100 and a host device 200.

The data storage device 100 may store data which are accessed by the host device 200 such as a mobile phone, MP3 player, laptop computer, desktop computer, game machine, television (TV) or in-vehicle infotainment system. The data storage device 100 may be referred to as a memory system.

The data storage device 100 may be fabricated as any one of various storage devices, depending on a host interface indicating a transmission protocol with the host device 200. For example, the data storage device 100 may be implemented with any one of various storage devices including a solid state drive (SSD), a multi-media card (e.g., MMC, eMMC, RS-MMC or micro-MMC), a secure digital (SD) card (e.g., mini-SD or micro-SD), a universal storage bus (USB) storage device, a universal flash storage (UFS) device, a personal computer memory card international association (PCMCIA)-type storage device, a peripheral component interconnection (PCI) card-type storage device, a PCI express (PCI-e or PCIe) card-type storage device, a compact flash (CF) card, a smart media card and a memory stick.

The data storage device 100 may be fabricated as any one of various types of packages. For example, the data storage device 100 may be fabricated as any one of various packages including a package-on-package (PoP), a system-on-chip (SoC), a multi-chip package (MCP), a chip-on-board (COB), a wafer-level fabricated package (WFP) and a wafer-level stack package (WSP).

The host device 200 may transmit a request REQ to the data storage device 100. The host device 200 may transmit and receive data DATA to and from the data storage device 100. The host device 200 may provide a voltage to the data storage device 100. The voltage may be for an operation of the data storage device 100. The host device 200 may provide first and second voltages VCC and VCCQ to the data storage device 100.

The first voltage VCC provided from the host device 200 may be applied to the nonvolatile memory device 110 of the data storage device 100. The second voltage VCCQ provided from the host device 200 may be applied to the nonvolatile memory device 110 and a controller 150 of the data storage device 100. The first voltage VCC provided from the host device 200 may be used as a voltage required for performing operations for a cell and a peripheral circuit of the nonvolatile memory device 110. The second voltage VCCQ provided from the host device 200 may be used as a voltage for performing operations of various function blocks in the controller 150, and provided to an interface (e.g., an input/output (I/O) interface 119 of FIG. 2) of the nonvolatile memory device 110. That is, in the nonvolatile memory device 110 of FIG. 2, a memory cell array 111 and a peripheral circuit Peri may be operated by the first voltage VCC, and the I/O interface 119 may be operated by the second voltage VCCQ.

The data storage device 100 may include the nonvolatile memory device 110 and the controller 150.

The nonvolatile memory device 110 may operate as a storage medium of the data storage device 100. Depending on memory cells, the nonvolatile memory device 110 may be implemented with any one of various nonvolatile memory devices including a NAND flash memory device, a NOR flash memory device, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide.

FIG. 1 illustrates that the data storage device 100 includes one nonvolatile memory device 110, but this is only an example. The data storage device 100 may include a plurality of nonvolatile memory devices, and the present embodiment may also be applied to the data storage device 100 including the plurality of nonvolatile memory devices.

Figure 2:
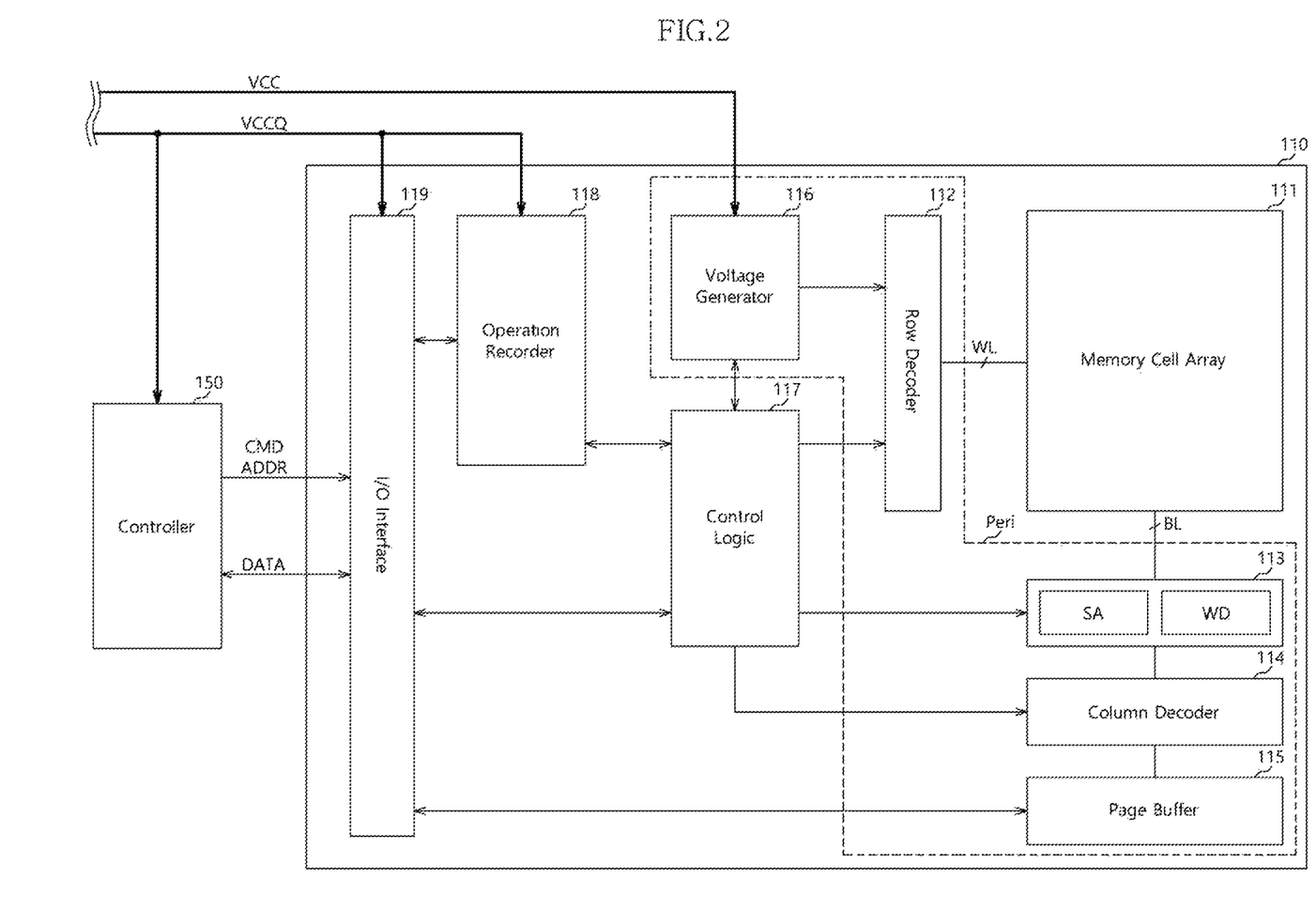
FIG. 2 is a block diagram illustrating a nonvolatile memory device in accordance with an embodiment of the present disclosure.

FIG. 2 illustrates a nonvolatile memory device in accordance with an embodiment of the present disclosure, for example, the nonvolatile memory device 110. Referring to FIG. 2, the nonvolatile memory device 110 may include a memory cell array 111, a row decoder 112, a data read and write (read/write) circuit 113, a column decoder 114, a page buffer 115, a voltage generator 116, a control logic 117, an operation recorder 118 and an input and output (I/O) interface 119. The row decoder 112, the data read/write circuit 113, the column decoder 114, the page buffer 115 and the voltage generator 116 may be collectively referred to as the peripheral circuit (Peri).

The memory cell array 111 may include a plurality of memory cells arranged at the respective intersections between a plurality of bit lines BL and a plurality of word lines WL. The memory cell array 111 may include a plurality of memory blocks, and each of the memory blocks may include a plurality of pages.

For example, each of the memory cells in the memory cell array 111 may be set to a single level cell (SLC) capable of storing one bit of data, a multi-level cell (MLC) capable of storing 2 bits of data, a triple level cell (TLC) capable of storing 3 bits of data, or a quad level cell (QLC) capable of storing 4 bits of data. The memory cell array 111 may include one or more of the SLC, the MLC, the TLC and the QLC. For example, the memory cells of the memory cell array 111 may be configured in a two-dimensional horizontal structure or in a three-dimensional vertical structure.

The row decoder 112 may be coupled to the memory cell array 111 through the word lines WL. The row decoder 112 may be operated according to control of the control logic 117. The row decoder 112 may decode a row address provided from an external device, e.g., the controller 150 of FIG. 1, and select and drive the word lines WL based on the decoding result. The row decoder 112 may provide a word line voltage from the voltage generator 116 to the selected word line WL.

The data read/write circuit 113 may be coupled to the memory cell array 111 through the bit lines BL. The data read/write circuit 113 may include read/write circuits (not illustrated) corresponding to the respective bit lines BL. The data read/write circuit 113 may be operated according to control of the control logic 117. The data read/write circuit 113 may operate as a write driver or sense amplifier, depending on the operation mode. The data read/write circuit 113 may operate as a write driver which stores data provided from an external device into the memory cell array 111 during a write operation. The data read/write circuit 113 may operate as a sense amplifier which reads data from the memory cell array 111 during a read operation.

The column decoder 114 may operate according to control of the control logic 117. The column decoder 114 may decode a column address provided from the controller 150. The column decoder 114 may couple the read/write circuits of the data read/write circuit 113 corresponding to the respective bit lines BL to the page buffer 115 based on the decoding result.

The page buffer 115 may temporarily store data which are provided from the controller 150 and will be stored in the memory cell array 111 or data which are read from the memory cell array 111 and will be provided to the controller 150. The page buffer 115 may operate according to control of the control logic 117.

The voltage generator 116 may generate a voltage used for an internal operation of the nonvolatile memory device 110. The voltage generator 116 may generate a voltage used for an internal operation of the nonvolatile memory device 110 using an operating voltage (i.e., the first voltage VCC) applied from the host device 200. The voltage generator 116 may provide the generated voltage to the memory cell array 111, the peripheral circuit (Peri) and the control logic 117. The internal operation may include a cell operation for the memory cell array 111 and a peripheral circuit operation for the peripheral circuit. The voltages generated by the voltage generator 116 may be applied to the memory cells of the memory cell array 111. A write (or program) voltage generated during a write operation may be applied to a word line WL of memory cells on which the write operation is to be performed. An erase voltage generated during an erase operation may be applied to a well region of memory cells on which the erase operation is to be performed. A read voltage generated during a read operation may be applied to a word line WL of memory cells on which the read operation is to be performed.

The control logic 117 may control the overall operations of the nonvolatile memory device 110 based on the control signals provided from the controller 150. For example, the control logic 117 may control read, write and erase operations of the nonvolatile memory device 110 according to a read command, write command and erase command which are received from the controller 150.

The operation recorder 118 may be configured to record information on an operation which is being performed in the nonvolatile memory device 110. The operation recorder 118 may operate according to control of the control logic 117. The second voltage VCCQ provided from the host device 200 may be applied to the operation recorder 118. Therefore, the operation recorder 118 can operate even though the memory cell array 111 and the peripheral circuit Peri of the nonvolatile memory device 110 are powered off due to an abnormality of the first voltage VCC provided from the host device 200. The operation recorder 118 may be configured to record only the information on the operation which is being performed, but the present invention is not specifically limited thereto.

Figure 3A:
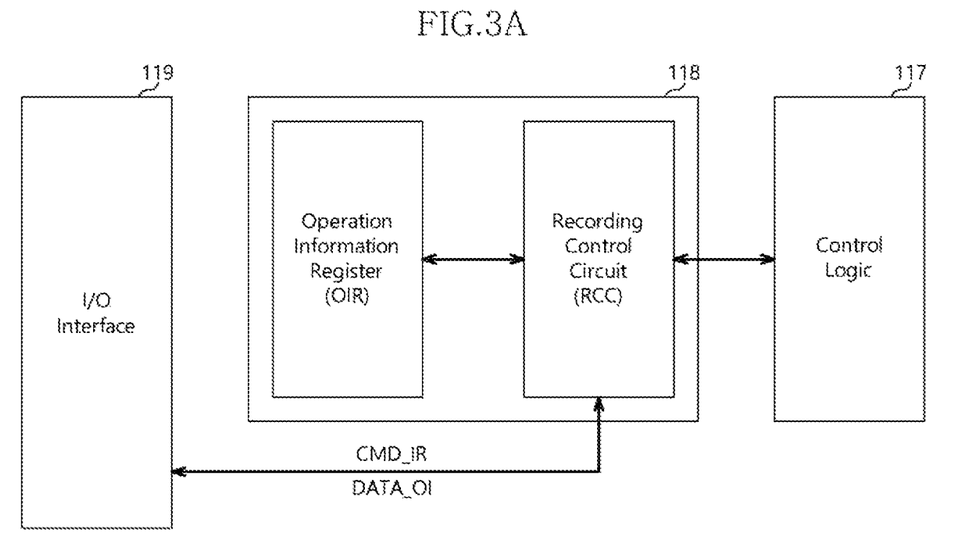
FIGS. 3A and 3B are block diagrams illustrating operation recorders in accordance with embodiments of the present disclosure.
Figure 3B:
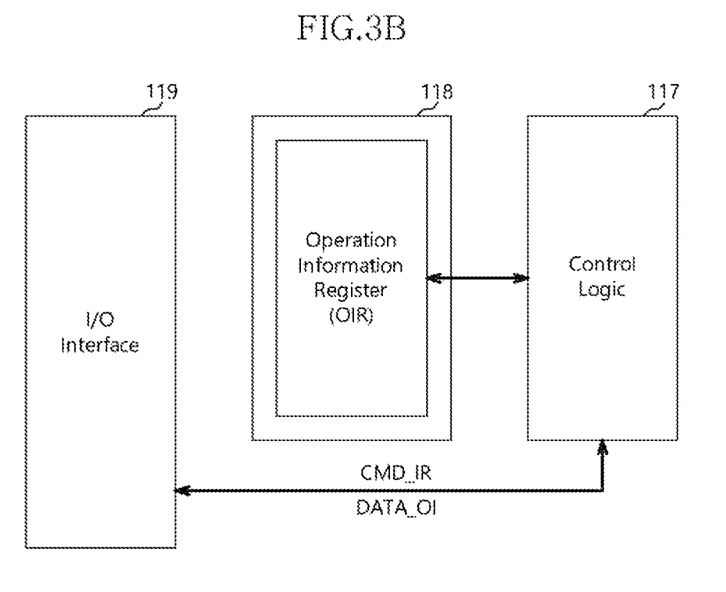

FIGS. 3A and 3B illustrate different configurations of an operation recorder, e.g., the operation recorder 118 in FIG. 2, in accordance with an embodiment of the present disclosure.

Referring to FIG. 3A, the operation recorder 118 may include an operation information register OIR and a recording control circuit RCC. The operation information register OIR may store information on the operation which is being performed in the nonvolatile memory device 110. The recording control circuit RCC may record or capture the information on the operation which is being performed on the nonvolatile memory device 110 and store the recorded information in the operation information register OIR according to control of the control logic 117. Further, the recording control circuit RCC may provide operation information DATA_OI recorded in the operation information register OIR to the controller 150 in response to an information request command CMD_IR provided from the controller 150.

Since the second voltage VCCQ is applied to the operation recorder 118 as described above, the operation information recorded in the operation information register OIR may be retained even when the nonvolatile memory device 110 is powered off. Furthermore, since the recording control circuit RCC is also operated by the second voltage VCCQ, the recording control circuit RCC may receive the information request command CMD_IR from the controller 150, and provide the operation information DATA_OI recorded in the operation information register OIR to the controller 150 through the I/O interface 119, even when the nonvolatile memory device 110 is powered off. In other words, the operation recorder 118 illustrated in FIG. 3A may process the information request command CMD_IR received from the controller 150 and transmit data, even when the nonvolatile memory device 110 is powered off.

Referring to FIG. 3B, the operation recorder 118 may include only the operation information register OIR. As described above with reference to FIG. 3A, the operation information register OIR may store information on an operation which is being performed in the nonvolatile memory device 110. The control logic 117 may perform the functions of the RCC in FIG. 3A. That is, in the embodiment of FIG. 3B, the control logic 117 may record or capture the information on the operation which is being performed in the nonvolatile memory device 110 and store the recorded information in the operation information register OIR of the operation recorder 118. Further, the control logic 117 may provide the operation information DATA_OI recorded in the operation information register OIR to the controller 150 through the I/O interface 119 when the information request command CMD_IR is received from the controller 150 after the nonvolatile memory device 110 is recovered to a normal state from a power-off state.

Since the second voltage VCCQ is supplied to the operation recorder 118 even when the nonvolatile memory device 110 is powered off, the operation information recorded in the operation information register OIR may be retained. The operation information recorded in the operation recorder 118 of FIG. 3B may be provided to the controller 150 according to control of the control logic 117, after the nonvolatile memory device 110 was recovered to a normal state.

Figure 4:
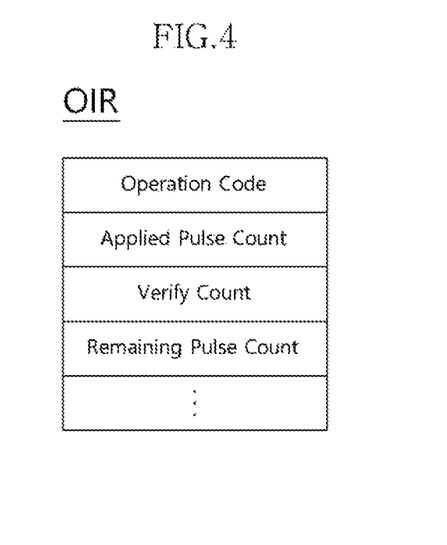
FIG. 4 is a diagram illustrating an operation information register in accordance with an embodiment of the present disclosure.

FIG. 4 illustrates the operation information register OIR in accordance with an embodiment of the present disclosure.

Referring to FIG. 4, the operation information register OIR may include a region for storing information on an operation code, a region for storing an applied pulse count, a region for storing a verify count, and a region for storing a remaining pulse count. The applied pulse count may indicate the number of pulses applied to operation target cells of the memory cell array 111 of FIG. 2. The operation information register OIR illustrated in FIG. 4 is only an example. The operation information register OIR is not specifically limited to the illustrated configuration; rather, the operation information register OIR may be implemented in various other ways as those skilled in the art will understand.

Referring again to FIG. 2, the I/O interface 119 may be configured to receive a command, address and data from the memory interface 157 of the controller 150. Further, the I/O interface 119 may provide data read from the memory cell array 111 and the operation information recorded in the operation recorder 118 to the memory interface 157 of the controller 150. The I/O interface 119 may output the command and address provided from the memory interface 157 to the control logic 117, and output the data provided from the memory interface 157 to the page buffer 115. The I/O interface 119 may operate according to control of the control logic 117.

As described above, the second voltage VCCQ may be applied to the I/O interface 119. Therefore, even when the memory cell array 111 and the peripheral circuit Peri of the nonvolatile memory device 110 are not being operated or have been powered off due to an abnormality concerning the first voltage VCC, the I/O interface 119 may maintain a normal state with the operation recorder 118.

Referring again to FIG. 1, the controller 150 may include a host interface 151, a processor 153, a memory 155 and the memory interface 157.

The host interface 151 may interface the host device 200 and the data storage device 100. For example, the host interface 151 may communicate with the host device 200 using any one of standard transmission protocols including a universal storage bus (USB), a universal flash storage (UFS), a multi-media card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe).

The processor 153 may include a micro control unit (MCU) and/or a central processing unit (CPU). The processor 153 may process the request REQ received from the host device 200. The processor 153 may drive a code-based instruction or algorithm, i.e. software, which is loaded into the memory 155, and control internal function blocks and the nonvolatile memory device 110, in order to process the request REQ received from the host device 200.

The memory 155 may include a random access memory (RAM) as a dynamic RAM (DRAM) or a static RAM (SRAM). The memory 155 may store software driven by the processor 153. The memory 155 may store data (for example, meta data) required for driving the software. That is, the memory 155 may operate as a working memory of the processor 153. The memory 155 may temporarily store data to be transmitted to the nonvolatile memory device 110 from the host device 200 or data to be transmitted to the host device 200 from the nonvolatile memory device 110. That is, the memory 155 may operate as a data buffer memory or data cache memory.

The memory interface 157 may control the nonvolatile memory device 110 according to control of the processor 153. The memory interface 157 may be referred to as a memory controller. The memory interface 157 may provide control signals to the nonvolatile memory device 110. The control signals may include a command and address for controlling the nonvolatile memory device 110. The memory interface 157 may provide data to the nonvolatile memory device 110, or receive data from the nonvolatile memory device 110. The memory interface 157 may be coupled to the nonvolatile memory device 110 through a channel CH including one or more signal lines.

The controller 150 may be operated by the second voltage VCCQ provided by the host device 200. The processor 153 of the controller 150 may generate a command to provide to the nonvolatile memory device 110, based on the request REQ received from the host device 200, and control the memory interface 157 to provide the command to the nonvolatile memory device 110.

After the command is provided to the nonvolatile memory device 110, the processor 153 may periodically transmit a status request command to the nonvolatile memory device 110 in order to receive processing status information on the corresponding command. When the nonvolatile memory device 110 is in a normal state, the nonvolatile memory device 110 may transmit status information to the processor 153 within a set time, in response to the status request command received from the processor 153. When the status information is not received from the nonvolatile memory device 110 within the set time after the status request command was transmitted, the processor 153 may determine that an abnormality occurred in the nonvolatile memory device 110.

When it is determined that an abnormality occurred in the nonvolatile memory device 110, the processor 153 may transmit an identification (ID) request command to the nonvolatile memory device 110. The ID request command may indicate a command for requesting identification information of the nonvolatile memory device 110. When abnormal data or invalid data are received from the nonvolatile memory device 110, the processor 153 may determine that the nonvolatile memory device 110 is powered off.

When the operation recorder 118 of the nonvolatile memory device 110 includes the components illustrated in FIG. 3A, the processor 153 may transmit the information request command CMD_IR to the nonvolatile memory device 110, after determining that the nonvolatile memory device 110 is powered off. The I/O interface 119 of the nonvolatile memory device 110 may provide the received information request command CMD_IR to the operation recorder 118.

The recording control circuit RCC of the operation recorder 118 may fetch the operation information DATA_OI recorded in the operation information register OIR and provide the fetched information to the I/O interface 119, in response to the information request command CMD_IR provided from the I/O interface 119. The operation information DATA_OI recorded in the operation information register OIR may include information on the last operation which was stopped when the nonvolatile memory device 110 was powered off. The I/O interface 119 may transmit the received operation information DATA_OI to the memory interface 157 of the controller 150.

The processor 153 may check the information on the operation which was last performed before the nonvolatile memory device 110 was powered off, based on the operation information DATA_OI received through the memory interface 157.

When the operation recorder 118 of the nonvolatile memory device 110 includes the components illustrated in FIG. 3B, the processor 153 may transmit the ID request command to the nonvolatile memory device 110 until normal data (or valid data) are received from the nonvolatile memory device 110.

When valid data are received from the nonvolatile memory device 110, the processor 153 may transmit the information request command CMD_IR to the nonvolatile memory device 110. The I/O interface 119 of the nonvolatile memory device 110 may provide the received information request command CMD_IR to the control logic 117. The control logic 117 may fetch the operation information DATA_OI recorded in the operation information register OIR and provide the fetched information to the I/O interface 119, in response to the information request command CMD_IR provided from the I/O interface 119. The I/O interface 119 may transmit the provided operation information DATA_OI to the memory interface 157 of the controller 150.

In an embodiment, the nonvolatile memory device 110 may include the operation recorder 118 which shares the same voltage (i.e., the second voltage VCCQ) with the controller 150 and records information on an operation which is being performed. Therefore, the controller 150 may determine to which command an operation which was performed by the nonvolatile memory device 110 corresponds, or at which step the operation was stopped. Therefore, the controller 150 may actively deal with the situation after the nonvolatile memory device 110 was recovered to a normal state from a power-off state.

For example, when the nonvolatile memory device 110 was powered off while performing an operation corresponding to a program command, the controller 150 may check operation information based on the operation information recorded in the operation recorder 118. The operation information may indicate that the nonvolatile memory device 110 was stopped during the program operation or indicate how many program pulses were applied before the nonvolatile memory device 110 was stopped. According to the check result, the controller 150 may determine that the region where the program operation was stopped is an unreliable region, and not use the determined region.

Figure 5:
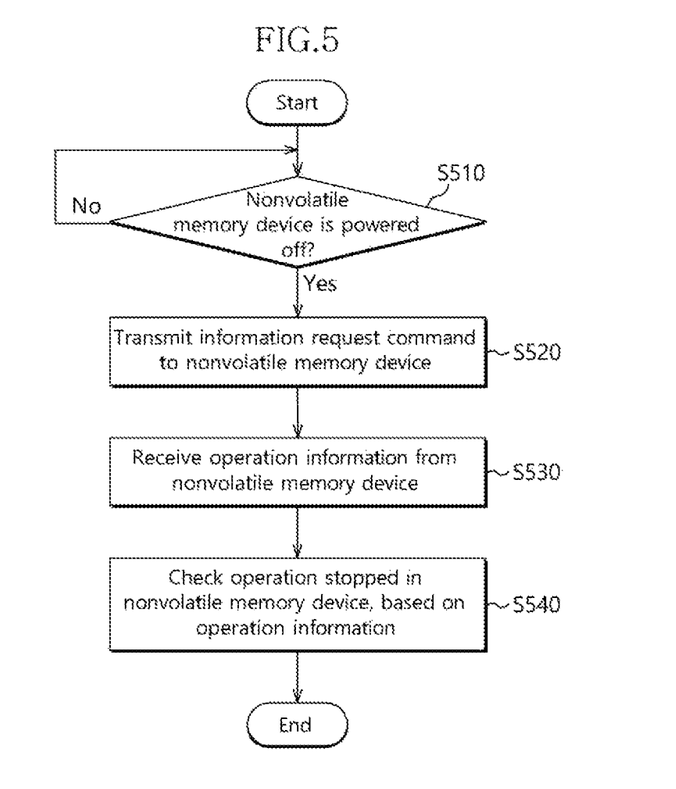
FIG. 5 is a flowchart illustrating an operating method of a data storage device in accordance with an embodiment of the present disclosure.

FIG. 5 is a flowchart illustrating an operating method of a data storage device in accordance with an embodiment. The operation method is described primarily with reference to FIG. 5, but also with reference to FIGS. 1 to 4.

Referring to FIG. 5, at step S510, the processor 153 of the controller 150 may determine whether the nonvolatile memory device 110 is powered off. The processor 153 may transmit a command to the nonvolatile memory device 110, and then transmit a status request command to the nonvolatile memory device 110. The status request command may be for requesting processing status information of the corresponding command. The nonvolatile memory device 110 may provide the processing status information to the controller 150 in response to the status request command.

When the processing status information is not received from the nonvolatile memory device 110 within a set time after the status request command was transmitted, the processor 153 may determine that an abnormality occurred in the nonvolatile memory device 110, and transmit an ID request command to the nonvolatile memory device 110. When data provided from the nonvolatile memory device 110 in response to the ID request command are abnormal data or invalid data, the processor 153 may determine that the nonvolatile memory device 110 is powered off. When it is determined that the nonvolatile memory device 110 is powered off, the method may proceed to step S520.

At step S520, the processor 153 may transmit the information request command CMD_IR to the nonvolatile memory device 110. For example, when the nonvolatile memory device 110 is powered off, the processor 153 may transmit the information request command CMD_IR to the nonvolatile memory device 110. For another example, when the nonvolatile memory device 110 is recovered to a normal state, the processor 153 may transmit the information request command CMD_IR to the nonvolatile memory device 110. The processor 153 may periodically transmit the ID request command to the nonvolatile memory device 110. When valid data are received from the nonvolatile memory device 110, the processor 153 may determine that the nonvolatile memory device 110 is recovered to a normal state, and transmit the information request command CMD_IR to the nonvolatile memory device 110.

At step S530, the processor 153 may receive the operation information DATA_OI from the nonvolatile memory device 110. For example, when the processor 153 transmits the information request command CMD_IR at step S520 while the nonvolatile memory device 110 is powered off, the processor 153 may receive the operation information DATA_OI from the recording control circuit RCC of the operation recorder 118 of the nonvolatile memory device 110. On the other hand, when the processor 153 transmits the information request command CMD_IR at step S520 after the nonvolatile memory device 110 was recovered to the normal state, the processor 153 may receive the operation information DATA_OI from the control logic 117 of the nonvolatile memory device 110.

At step S540, the processor 153 may check information based on the operation information DATA_OI received from the nonvolatile memory device 110. The information may indicate to which command the operation stopped by the power-off of the nonvolatile memory device 110 corresponds, or indicate at which step the operation was stopped.

In accordance with embodiments of the present invention, the nonvolatile memory device may include the operation recorder which shares the voltage with the controller and records information on an operation which is being performed. Thus, the controller may check an operation stopped by a power-off of the nonvolatile memory device and performance status of the operation. Therefore, the controller may accurately determine and control the status of the nonvolatile memory device recovered to a normal state.

Figure 6:
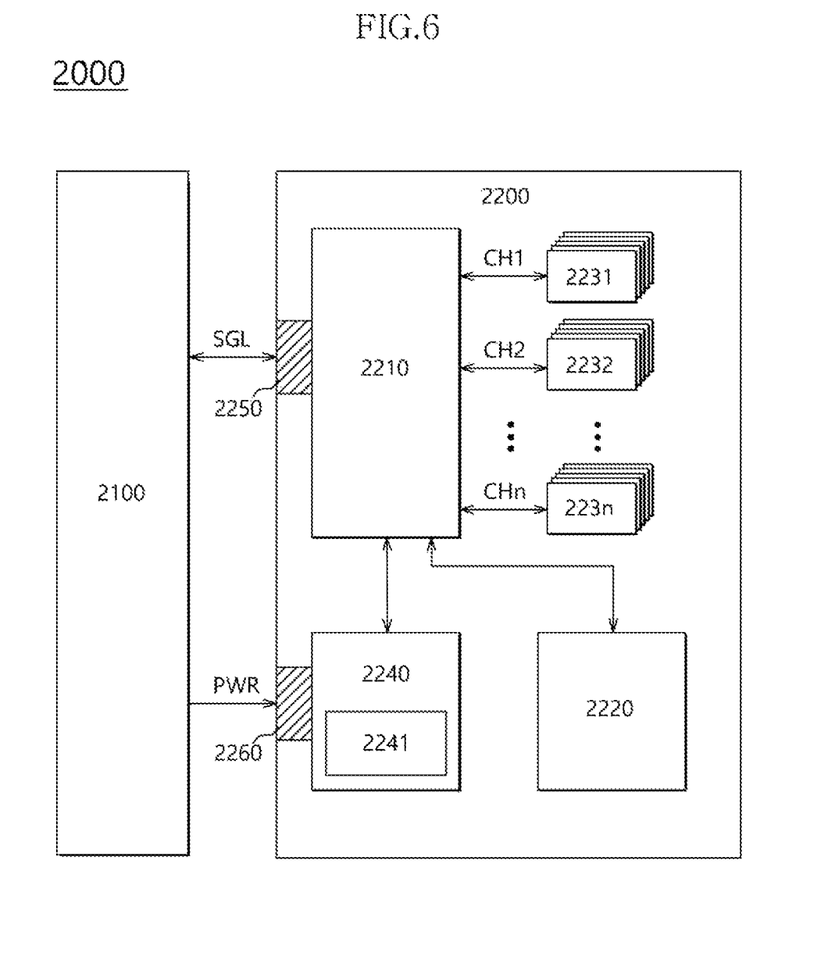
FIG. 6 is a diagram illustrating a data processing system including a solid state drive (SSD) in accordance with an embodiment of the present disclosure.

FIG. 6 is a diagram illustrating a data processing system 2000 including a solid state drive (SSD) 2200 according to an embodiment of the present disclosure. Referring to FIG. 6, the data processing system 2000 may include a host device 2100 and the SSD 2200.

The SSD 2200 may include a controller 2210, a buffer memory device 2220, nonvolatile memory devices 2231 to 223$n$, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223$n$. The buffer memory device 2220 may temporarily store data read from the nonvolatile memory devices 2231 to 223$n$. The data temporarily stored in the buffer memory device 2220 may be transmitted to the host device 2100 or the nonvolatile memory devices 2231 to 223$n$ according to control of the controller 2210.

The nonvolatile memory devices 2231 to 223$n$ may be used as a storage medium of the SSD 2200. The nonvolatile memory devices 2231 to 223$n$ may be coupled to the controller 2210 through a plurality of channels CH1 to CH$n$. One or more nonvolatile memory devices may be coupled to one channel. The nonvolatile memory devices coupled to the one channel may be coupled to the same signal bus and the same data bus.

The power supply 2240 may provide power PWR that is input through the power connector 2260 to components of the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host device 2100 through the signal connector 2250. The signal SGL may include a command, an address, data, and the like. The signal connector 2250 may be configured as any of various types of connectors according to an interfacing method between the host device 2100 and the SSD 2200.

Figure 7:
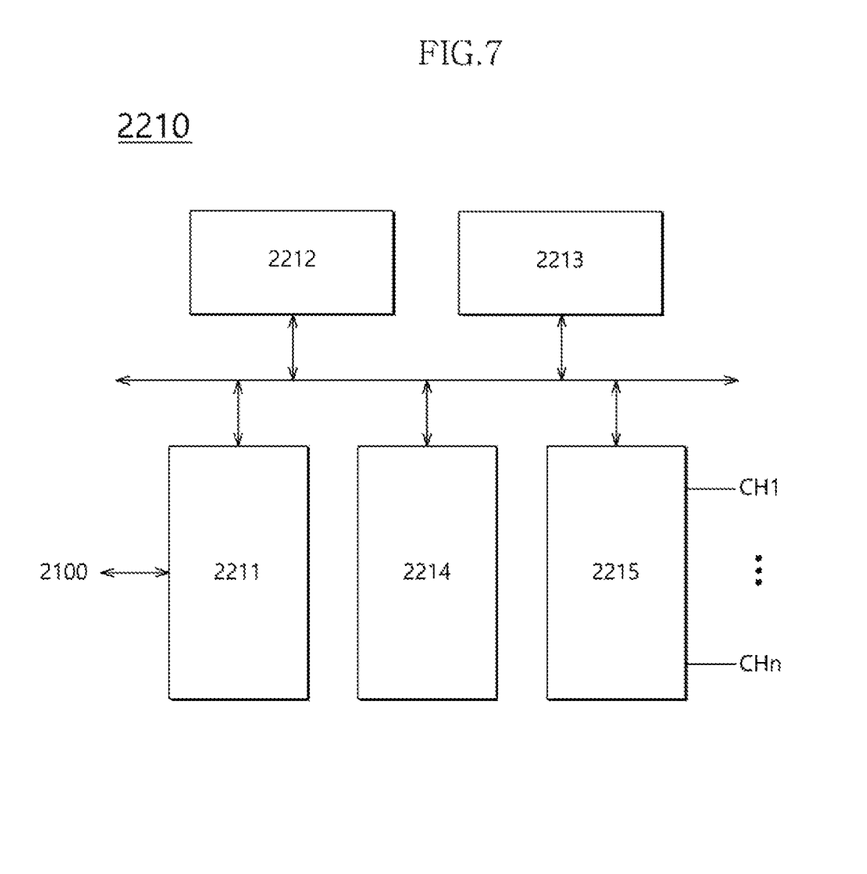
FIG. 7 is a diagram illustrating a controller illustrated in FIG. 6.

FIG. 7 is a diagram illustrating a controller, e.g., the controller 2210 of FIG. 6, in accordance with an embodiment of the present disclosure. Referring to FIG. 7, the controller 2210 may include a host interface 2211, a control component 2212, a random access memory (RAM) 2213, an error correction code (ECC) component 2214, and a memory interface 2215.

The host interface 2211 may perform interfacing between the host device 2100 and the SSD 2200 according to a protocol of the host device 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface 2211 may perform a disc emulation function in which the host device 2100 recognizes the SSD 2200 as a general-purpose data storage device, for example, as a hard disc drive HDD.

The control component 2212 may analyze and process the signal SGL input from the host device 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 8:
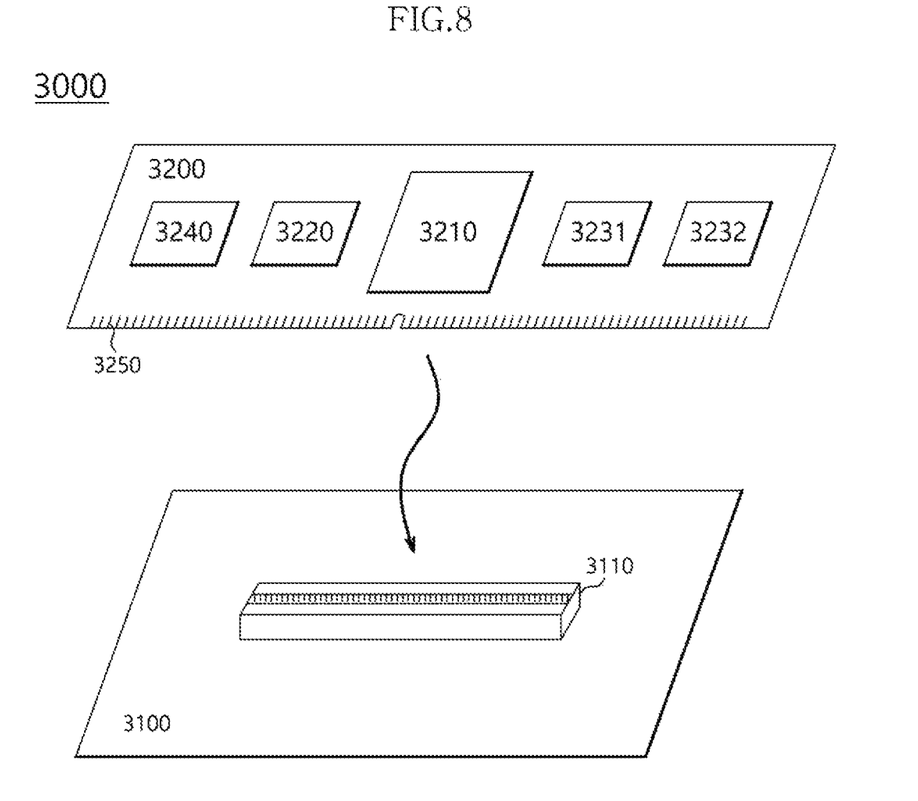
FIG. 8 is a diagram illustrating a data processing system including a data storage device in accordance with an embodiment of the present disclosure.

FIG. 8 is a diagram illustrating a data processing system 3000 including a data storage device 3200 in accordance with an embodiment of the present disclosure. Referring to FIG. 8, the data processing system 3000 may include a host device 3100 and the data storage device 3200.

The host device 3100 may be configured in the form of a board such as a printed circuit board (PCB). Although not shown in FIG. 8, the host device 3100 may include internal functional blocks configured to perform functions of the host device 3100.

The host device 3100 may include a connection terminal 3110 such as a socket, a slot, or a connector. The data storage device 3200 may be mounted on the connection terminal 3110.

The data storage device 3200 may be configured in the form of a board such as a PCB. The data storage device 3200 may be a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 7.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to components of the data storage device 3200. The PMIC 3240 may manage the power of the data storage device 3200 according to control of the controller 3210.

The connection terminal 3250 may be coupled to the connection terminal 3110 of the host device 3100. A signal such as a command, an address, and data and power may be transmitted between the host device 3100 and the data storage device 3200 through the connection terminal 3250. The connection terminal 3250 may be configured in various forms according to an interfacing method between the host device 3100 and the data storage device 3200. The connection terminal 3250 may be arranged on any side of the data storage device 3200.

Figure 9:
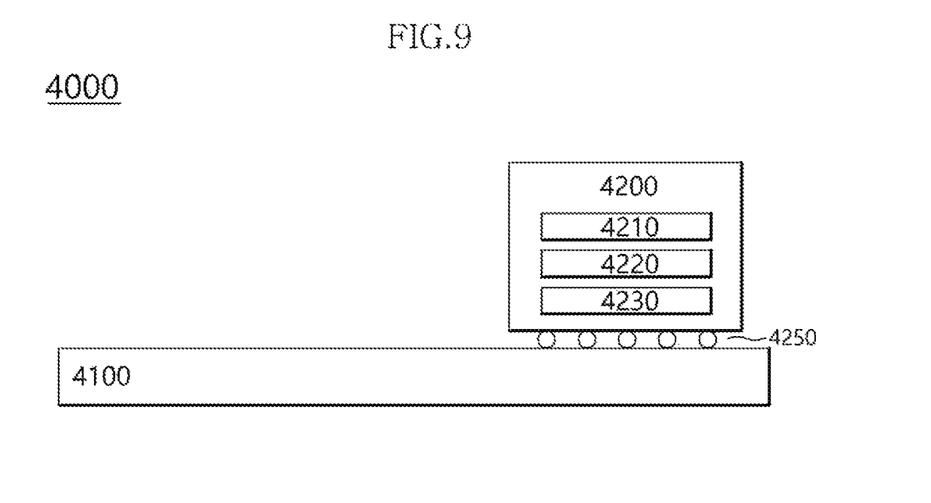
FIG. 9 is a diagram illustrating a data processing system including a data storage device in accordance with an embodiment of the present disclosure.

FIG. 9 is a diagram illustrating a data processing system 4000 including a data storage device 4200 in accordance with an embodiment of the present disclosure. Referring to FIG. 9, the data processing system 4000 may include a host device 4100 and the data storage device 4200.

The host device 4100 may be configured in the form of a board form such as a PCB. Although not shown in FIG. 9, the host device 4100 may include internal functional blocks configured to perform functions of the host device 4100.

The data storage device 4200 may be configured in a surface mounting packaging form. The data storage device 4200 may be mounted on the host device 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 7.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host device 4100 or the nonvolatile memory device 4230 through control of the controller 4210.

The nonvolatile memory device 4230 may be used as a storage medium of the data storage device 4200.

Figure 10:
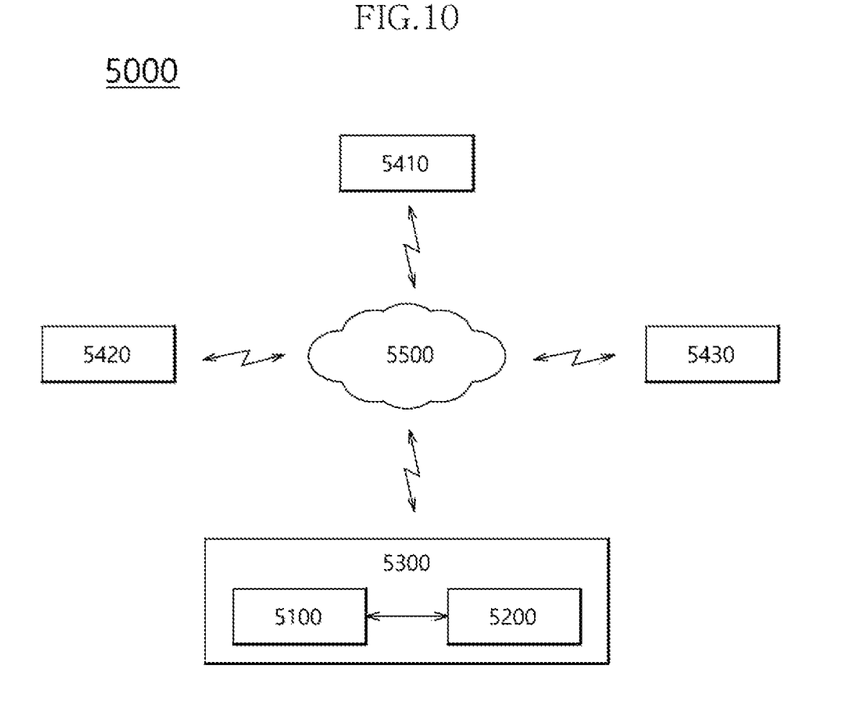
FIG. 10 is a diagram illustrating a network system including a data storage device in accordance with an embodiment of the present disclosure.

FIG. 10 is a diagram illustrating a network system 5000 including a data storage device in accordance with an embodiment. Referring to FIG. 10, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured of the data storage device 100 of FIG. 1, the data storage device 2200 of FIG. 6, the data storage device 3200 of FIG. 8, or the data storage device 4200 of FIG. 9.

While various embodiments have been illustrated and described, it will be understood to those skilled in the art that the embodiments described are examples only and that various changes and modifications may be made within the scope of the disclosure. Accordingly, the nonvolatile memory device, the data storage device including the same and the operating method thereof, which are described herein, should not be limited based on the described embodiments. Rather, the present invention encompasses not only the embodiments described herein but all modifications and variations thereof that fall within the scope of the claims.

What is claimed is:

1. A nonvolatile memory device comprising:
a memory cell array operated by a first voltage, and comprising a plurality of memory cells;
a peripheral circuit operated by the first voltage, and configured to store data in the memory cell array or read data from the memory cell array;
an operation recorder operated by a second voltage, and configured to record information on an operation being performed in the nonvolatile memory device; and
a control logic operated by the first voltage, and configured to control the peripheral circuit such that the nonvolatile memory device performs an operation corresponding to a command received from an external device, and control the operation recorder to store the information on the operation being performed in the nonvolatile memory device; and
an input/output (I/O) interface operated by the second voltage, and configured to transmit data to, and receive data from, the external device,
wherein, when the nonvolatile memory device is powered off due to an interruption to supply of the first voltage, the I/O interface provides an information request command received from the external device to the operation recorder, and the operation recorder provides the recorded operation information to the external device through the I/O interface in response to the information request command received from the external device.

2. The nonvolatile memory device according to claim 1, wherein the operation recorder comprises an operation information register configured to store the information on the operation being performed in the nonvolatile memory device.

3. The nonvolatile memory device according to claim 2, wherein the operation recorder further comprises a recording control circuit configured to record the information on the operation which is being performed in the nonvolatile memory device, and store the recorded information in the operation information register according to control of the control logic.

4. The nonvolatile memory device according to claim 1, wherein, when the memory cell array, the peripheral circuit and the control logic of the nonvolatile memory device, which were powered off due to the interruption to supply of the first voltage, are recovered to a normal state, the I/O interface provides the information request command received from the external device to the control logic, and the control logic provides the operation information recorded in the operation recorder to the external device through the I/O interface in response to the information request command.

5. The nonvolatile memory device according to claim 1, wherein the information on the operation comprises at least one of an operation code, an applied pulse count, a verify count, and a remaining pulse count.

* * * * *